United States Patent Office 3,273,962
Patented Sept. 20, 1966

3,273,962
PROCESS FOR PRODUCING OXIDES IN THE FORM OF HOLLOW SHELLS
Robert J. Walsh, Ballwin, Mo., assignor to Monsanto Company, St. Louis, Mo., a corporation of Delaware
No Drawing. Filed Mar. 17, 1965, Ser. No. 440,591
2 Claims. (Cl. 23—140)

The present patent application is a continuation-in-part of copending application Serial No. 80,032, filed January 3, 1961, now abandoned.

This invention relates to the production of oxides of certain metals in a hollow shell form having improved physical properties. It is an object of the invention to provide metal oxides existing in the form of micro shells, which are of particular utility in ceramic and electrical compositions, in the formulation of plastic and coating compositions, as heat insulating materials and as thickening agents.

It has been found that the preparation of hollow shell forms of single oxides and mixtures of oxides of metals of the group consisting of: aluminum, zirconium, zinc, magnesium, nickel, iron, cobalt, copper, manganese, chromium and vanadium may be carried out by decomposition of solutions of the corresponding metal sulfates, nitrates, acetates or oxalates. Atomization and decomposition of the aqueous or organic solvent solutions and dispersions of the said salts is carried out by atomizing the solutions into a flame of a combustible gas with air or oxygen so as to obtain a flame temperature maintained at 900° C. to 1150° C. within a combustion zone, the decomposition being carried out for a period of time of from 0.5 second to 0.001 second.

If it is desired to provide other oxides in combination with one or more of the above oxides, suitable compounds yielding such oxides may be supplied to the combustion zone in the form of suitable salts. For example, silica may be provided as an aqueous solution of ammonium silicofluoride or as a silica sol.

The shell particles which are crystalline or amorphous, are found to possess physical properties quite different from the properties of discrete particles or irregular aggregates obtained by prior art methods, or of gel forms of the oxides. Thus, it has been found that aqueous suspensions of these hollow shell oxides can be filtered with unusual ease. Consequently, the present oxides, for example, alumina in the form of hollow spheres is an excellent filter aid and suitable for use with fruit juices, beer, and other colloidal liquids. The shell form compositions of the above single oxides and combinations of oxides also enable filtration to be accomplished very readily with resultant ease of separation and purification of the oxide. In contradistinction, the prior art forms of these oxides as obtained from aqueous solution have been very slow filtering because of the gelatinous and compressible nature of the filter cakes. These gelatinous cakes also dry to a hard, horny product which must be ground in order to be further processed. It has been found that such grinding is unnecessary with the present products.

The hollow shells obtained in the practice of the present invention are in general hollow spheroidal particles having dimensions in the range of from 0.005 to 50 microns measured diameter. The average diameter of the spheroids has been found to vary within the range of from 1 to 10 microns. Some shattered spheres may also be present.

The oxides contemplated in the present invention include both single metal oxides and also combinations of oxides. Such combination oxides may exist as mixtures, solid solutions and stoichiometric and non-stoichiometric compounds.

Certain of the combination oxides of the present invention have been found to exist as solid solutions in a broad range of combinations, both in stoichiometric and in non-stoichiometric proportions. These solid forms exhibit physical properties differing from those of the component oxides either alone or in physical admixture. The solid solutions usually exist as crystalline materials.

In earlier methods, metal oxides have been prepared by precipitation from aqueous solutions but such processes require many laborious treating steps, including the handling of large volumes of corrosive liquids. Precipitation methods generally result in the formation of large heterogeneous agglomerates which require expensive grinding procedures to achieve a usable product of uniform particles. Vapor phase methods for producing oxides from iron carbonyl are also known. However, it has been found that in the vapor phase production of pure metal oxides from carbonyls, there are no hollow shells found in the products.

Technical applications of the present hollow spheroids include the manufacture of insulating refractories, e.g., for nose cones, and nozzle liners for missles and rockets. Other uses are in enamels, electrical insulating material, refractories, abrasives, polishing agents, bonding agents for glass fibers, ceramic powders for flame and plasma jet coating, and in the preparation of high temperature alloys. Other uses are as pigments, thermal insulation, as a dehydrating agent and in gas absorption and chromatographic absorption, as reinforcing agents in rubbers, plastics and asphalt, and as thickening agents for lubricating greases and oils. The novel compositions may also be employed in chemical reactions as catalysts, either as a support or as the catalyst per se, to direct the course of cracking, oxidation, hydrogenation, dehydrocyclization, dehydrogenation, and polymerization reactions.

The present process for the production of hollow shell particles of oxides is essentially a very rapid controlled decomposition carried out under specific conditions to obtain a puffing action from internally evolved gases. The starting materials for this process may be one or more of the group of sulfates, nitrates, acetates, and oxalates of the following group of metals: aluminum, zirconium, zinc, magnesium, nickel, iron, cobalt, copper, manganese, chromium, and vanadium. The said metal salts may be employed as the anhydrous form or as a hydrate such as the dihydrate, tetrahydrate or other commercial forms in which such compounds are available. The salts of the above metals are preferably used in a pure grade to avoid contamination of the oxide products. Impurities can greatly influence the physical and chemical characteristics of the oxides, so that pure starting materials are usually desirable.

The concentration of the metal sulfate, nitrate, acetate or oxalate dissolved or dispersed in the solution fed to the combustion zone may range from 1% by weight (anhydrous basis) to as high as the saturation limit and above in the case of dispersions. In this patent application, the term "solution" includes dispersions as well as simple solutions. The solvent is preferably water, although other inorganic or organic solvents may also be used to advantage. Typical organic solvents for the present process are alcohols or ketones as representative inert, combustible, organic liquids. The organic solvents employed for the present purpose must have less than 5 carbon atoms in the molecule, for example, methanol, ethanol, n-propanol, isopropanol, butanol, isobutanol, tert.-butanol, methyl ethyl ketone, acetone or dioxane.

In carrying out the decomposition process of the present invention, the solution or dispersion of the metal components is first atomized by contacting with a high velocity atomizing gas stream which may be inert (for example, nitrogen), or may contain oxygen either as a pure stream of oxygen or as air. The atomizing gas may also be combustible, for example, hydrogen or natural gas may be used. The atomizing gas stream is supplied in sufficient quantity to atomize the liquid feed. The gases employed in the present process may be purified in order to avoid contamination of the oxide product. The combustion gases such as hydrogen, natural gas and carbon monoxide should be free of difficultly combustible constituents such as tarry hydrocarbons so as to avoid the formation of organic occlusions and non-homogeneous, incompletely oxidized compositions. Secondary gas streams such as an auxiliary air stream may also be employed in order to promote complete combustion, and to prevent the deposition of oxides on the walls of the oxidation vessel. The present oxidation process is carried out at a high temperature so that it is desirable to provide a refractory vessel which may be vertically or horizontally disposed. The particles leaving the oxidation zone are cooled by direct or indirect heat exchange and are then collected by suitable means such as a water scrubber, a cyclone separator, electrostatic precipitator, bag filters, etc.

It has been found that the above described process carried out with the specific group of metal sulfates, nitrates, acetates or oxalates set forth above causes these specific salts to decompose with the internal evolution of gases to hollow-shell form of single oxides or mixtures of oxides as discrete particles. The said oxides may be produced with a range of particle sizes of 0.005 to 50 microns, a preferred range of average particle size being from 1 to 10 microns. It has been found, for example, that an average particle size of 5 microns can be obtained by the decomposition of a solution of ferrous sulfate dissolved in water.

When combustion occurs, the fuel gas and/or the solvent gases are burned, preferably as an oxidizing flame, to provide uniform heating and at the same time permit decomposition of the metal salts to the corresponding hollow shell oxides without permitting excess crystal growth at this stage. The atomizing carrier gas may be employed in the minimum amount required to atomize the solution or may be used in excess, for example, in the amount required for combustion in order to heat the mixture to reaction temperature. The hollow shell oxides are obtained when operating with a flame temperature of from 900° C. to 1150° C., for a period of time of 0.5 second to 0.001 second, a preferred range being from 0.1 second to 0.01 second. In order to provide for sufficient heat in the oxidation step, secondary air and fuel may also be provided. The combustion of the hydrogen, carbon monoxide, natural gas, or other combustible gas with air or oxygen thus provides the heat necessary for the decomposition. Pure oxygen or oxygen enriched air may be employed to provide higher flame temperatures. In those instances in which an organic liquid solvent is employed, additional heat is supplied by the combustion of such organic liquid. The combustible components are supplied in amount sufficient to maintain the particles in the reaction zone at the desired temperature as set forth above.

In order to obtain the desirable hollow shell oxides, it has been found essential to carry out the operation at a relatively low flame temperature e.g. in the range of from 900° C. to 1150° C. This is accomplished conveniently by feeding a high proportion of the above described salt solution, in the concentration ranges defined above, relative to the amount of fuel gas. In this way the gaseous expansion of the solution results in the decomposition of the salts present in the solution with the formation of the resultant metal oxides. Alternatively the flame temperature may be reduced by operating in a water cooled combustion chamber rather than a refractory lined chamber so as to increase heat loss from the flame by radiation to the cold walls. The use of the above described low temperature range has been found to avoid the explosive bursting of the hollow shell particles into laminar shell fragments.

The critical ratio of the weight proportions of combustible fuel gas relative to the salt solution as charged to the flame burner has been found to be preferably maintained at not more than 0.6 and more preferably in the range of from 0.1 as the lower limit to 0.6 as the upper limit for the fraction: (weight of natural gas/weight of salt solution). Thus it has been found that when the proportion of natural gas relative to the salt solution which is fed is decreased, the proportion of hollow shells in the products increases and that within the above defined range of not more than 0.6, the product consists predominately of hollow shells.

The cooling and collection of the product is carried out in a controlled temperature region maintained at from 50° C. to 350° C., or more preferably from 50° C. to 200° C. The product stream leaving the combustion zone may be cooled by passage through condensers or by quenching, such as by the addition of cool air or other vapors and liquids, for example, water. A preferred method of operation is to collect the product in a spray tower using a water spray to cool and collect the oxides.

The following examples illustrate specific embodiments of the present invention.

*Example 1*

A hollow shell form of nickel oxide was prepared by charging an aqueous solution containing 58.6 lbs. of nickel nitrate, $(Ni(NO_3)_2 \cdot 6H_2O)$ and 25 lbs. of water, at a rate of 14.6 lb./hr. to a burner nozzle, atomizing this with a stream of natural gas flowing at a rate of 5.6 lb./hr., a pilot gas stream flowing at a rate of 2.0 lb./hr., (total gas 7.6 lb./hr.), and an air stream flowing at a rate of 200 lb./hr. to produce a stable oxidizing flame, with the wt. ratio (natural gas/salt solution) being 0.52. The product obtained contained a hollow shell spheroidal form of nickel oxide particles averaging 5 microns in diameter. However, the use of (combustible gas/salt solution) weight ratios above 0.6 gives laminar instead of spheroidal particles. The crystallite size was 0.2 micron by X-ray diffraction. The surface area (BET) was 6.9 sq. m./gm.

A water spray system was used to cool the oxide particles rapidly and to collect the product. It was found that the water slurry thus obtained could be filtered very readily. This is characteristic of the present form of nickel oxide; while the prior art gel and colloidal forms of the oxide are slow filtering, and very colloidal in nature.

*Example 2*

The preparation of aluminum oxide as hollow shells is shown in the following example. The feed solution was prepared by dissolving 500 pounds of aluminum sulfate, $Al_2(SO_4)_3 \cdot 14.5H_2O$ in 78.5 gal. of water. This solution was fed into an atomizing nozzle at the rate of 187.5 lb./hr. using natural gas as the atomizing gas supplied at the rate of 50.7 lb./hr. The pilot nozzle was supplied with 22.3 lb./hr. of natural gas, the total feed to the vertical combustion tower being 73 lb./hr. and the air feed totalling 1758 lb./hr. to give an oxidizing flame. The weight ratio of natural gas relative to salt solution is 0.39.

The introduction of the solution of the salt into the flame resulted in the rapid atomization of the solution and the decomposition of the salt, with the result that under the oxidizing conditions present in the flame, the product was substantially entirely composed of hollow shells and some fragments of shells. The flame from the burner was passed downward through a cooling and collection zone in which the hot combustion products were cooled by direct injection from water sprays. The finely divided oxide product was scrubbed from the gas stream by the cooling water sprays and withdrawn as a slurry. The powder was then isolated by decantation and filtration to yield the oxide as a finely divided powder.

When the product was examined under the electron microscope, the powder product was found to be composed of a substantial proportion consisting of hollow spheroidal shells and shell fragments of from 0.5 to 5 microns diameter, averaging 1.5 microns diameter. X-ray diffraction showed the product to be delta alumina and the crystallite size as less than 0.1 micron. The BET (nitrogen) surface area was 24 sq. m./gm.

Example 3

The present example illustrates the production of a laminar oxide product instead of the spheroidal hollow shell product described above.

A laminar form of alumina was prepared by charging an aqueous solution containing 23.8% by weight of $Al_2(SO_4)_3 \cdot 14.5H_2O$ at a rate of 4.6 lb./hr. to a burner nozzle together with a stream of natural gas flowing at a rate of 7.0 lb./hr. and an air stream flowing at a rate of 155 lb./hr. to produce a stable flame. The weight ratio (natural gas/salt solution) is about 1.5 which is above the critical value of 0.6 defining the region in which hollow shell particles are obtained. The product obtained was a laminar form of alumina consisting of irregularly shaped particles up to 15 microns in largest dimension with an average thickness of about 0.02 micron.

What is claimed is:

1. A process for the production of a hollow shell form of at least one of the oxides of aluminum, zirconium, zinc, magnesium, nickel, iron, cobalt, copper, manganese, chromium and vanadium, which comprises atomizing a solution of a salt selected from the class consisting of sulfates, nitrates, acetates and oxalates of the said metal in an organic solvent selected from the class consisting of alcohols and ketones having less than 5 carbon atoms in the molecule into a combustible gas flame, with the weight ratio of combustible gas relative to the weight of the salt solution being not more than 0.6, and therein decomposing the said salt with the evolution of a gas to form hollow spheres of the said oxide the said oxidation being conducted by means of an oxidizing flame at a flame temperature of from 900° C. to 1150° C. for a period of time of from 0.1 second to 0.01 second and thereafter cooling and collecting the product at a temperature in the range of from 50° C. to 350° C.

2. A process for the production of hollow shell particles of at least one oxide of the group consisting of aluminum, zirconium, zinc, magnesium, nickel, iron, cobalt, copper, manganese, chromium and vanadium oxides, the said hollow shell particles having an average particle diameter of from 1 to 10 microns, which comprises atomizing a solution of a salt selected from the class consisting of the sulfates, nitrates, acetates and oxalates of the said metals in water into a combustible gas flame, and therein decomposing the said salt with the evolution of a gas to form hollow spheres of the said oxide, and the said oxidation being conducted by means of an oxidizing flame at a flame temperature of 900° C. to 1150° C. for a period of time of from 0.5 second to 0.001 second and with the weight ratio of combustible gas relative to the weight of the salt solution being within the range of from 0.1 to 0.6, and thereafter cooling and collecting the product at a temperature in the range of from 50° C. to 350° C.

References Cited by the Examiner

UNITED STATES PATENTS

| | | | |
|---|---|---|---|
| 2,900,244 | 8/1959 | Bradstreet et al. | 23—140 X |
| 2,988,424 | 6/1961 | Walsh | 23—143 |
| 3,002,808 | 10/1961 | LaMont | 23—142 |
| 3,105,052 | 9/1963 | Haws | 23—139 X |

OTHER REFERENCES

Hansen et al., "Nuclear Science Abstracts," vol. 12, No. 23, Dec. 15, 1958, Abstract No. 17332.

OSCAR R. VERTIZ, *Primary Examiner.*

MAURICE A. BRINDISI, BENJAMIN HENKIN, H. T. CARTER, *Assistant Examiners.*